US010204035B1

(12) United States Patent
Surace et al.

(10) Patent No.: US 10,204,035 B1
(45) Date of Patent: Feb. 12, 2019

(54) SYSTEMS, METHODS AND DEVICES FOR AI-DRIVEN AUTOMATIC TEST GENERATION

(71) Applicant: APPVANCE INC., Sunnyvale, CA (US)

(72) Inventors: Kevin Surace, Sunnyvale, CA (US); Luis Carlos Lara Lopez, Sabanilla (CR)

(73) Assignee: APPVANCE INC., Sunnyvale, CA (US)

( * ) Notice: Subject to any disclaimer, the term of this patent is extended or adjusted under 35 U.S.C. 154(b) by 0 days.

(21) Appl. No.: 16/054,294

(22) Filed: Aug. 3, 2018

Related U.S. Application Data

(60) Provisional application No. 62/559,742, filed on Sep. 18, 2017, provisional application No. 62/542,223, filed on Aug. 7, 2017.

(51) Int. Cl.
| | | |
|---|---|---|
| *G06F 9/44* | (2018.01) | |
| *G06F 11/36* | (2006.01) | |
| *G06F 17/24* | (2006.01) | |
| *H04L 29/08* | (2006.01) | |
| *G06F 17/27* | (2006.01) | |
| *G06F 3/0484* | (2013.01) | |

(52) U.S. Cl.
CPC ...... *G06F 11/3688* (2013.01); *G06F 11/3664* (2013.01); *G06F 11/3684* (2013.01); *G06F 17/243* (2013.01); *G06F 17/2705* (2013.01); *H04L 67/22* (2013.01); *G06F 3/04842* (2013.01); *H04L 67/02* (2013.01)

(58) Field of Classification Search
CPC .................................. G06F 11/3688

USPC ......................................................... 717/124
See application file for complete search history.

(56) References Cited

U.S. PATENT DOCUMENTS

| | | | |
|---|---|---|---|
| 6,587,969 B1 | 7/2003 | Weinberg et al. | |
| 8,266,091 B1 | 9/2012 | Gubin et al. | |
| 8,799,714 B1 | 8/2014 | Guruswamy et al. | |
| 8,930,772 B2 * | 1/2015 | Sgro | G06F 11/3692 714/45 |
| 2004/0059809 A1 | 3/2004 | Benedikt et al. | |
| 2006/0117055 A1 | 6/2006 | Doyle | |
| 2008/0082968 A1 | 4/2008 | Chang et al. | |
| 2013/0086420 A1 * | 4/2013 | Sgro | G06F 11/3692 714/32 |

(Continued)

OTHER PUBLICATIONS

"Connected QA: Selenium + Log Analysis", Rapid7, Blog dated Dec. 17, 2014, downloaded from: https://blog.rapid7.com/2014/12/17/connected-qa-selenium-log-analysis/, 11 pages.

(Continued)

*Primary Examiner* — John Q Chavis
(74) *Attorney, Agent, or Firm* — Ascenda Law Group, PC

(57) ABSTRACT

A test script is generated in an automated fashion based on a master key file (and optionally, additionally based on user logs) in order to test a software application. The master key file may include one or more scripts of every (or nearly every) possible interaction (e.g., request, presentation, executed action, and so on) a user may have with the software application under test. Often times, the master key file captures each and every request that could be made from a client device to the software application under test executing at a server.

20 Claims, 4 Drawing Sheets

(56) References Cited

U.S. PATENT DOCUMENTS

2015/0007149 A1    1/2015  Maddela

OTHER PUBLICATIONS

Riley, Chris, "Adding Log Analysis to QA Will Improve Your Process", Applittools, Blog dated Dec. 16, 2014, downloaded from: https://applitools.com/blog/adding-log-analysis-to-qa-will-improve-your, 6 pages.
Singh, Karan, "Web Application Performance Requirements Deriving Methodology", Helsinki Metropolia University of Applied Sciences, Master's Thesis dated Jun. 17, 2016, 58 pages.
Stern; et al., "Integrating Artificial Intelligence in Software Testing", Software Symposium 2013, PPT created Jun. 4, 2013, 42 pages.

\* cited by examiner

SYSTEMS, METHODS AND DEVICES FOR AI-DRIVEN AUTOMATIC TEST GENERATION

RELATED APPLICATIONS

This application is a non-provisional patent application of and claims priority to U.S. Provisional Application No. 62/559,742, filed 18 Sep. 2017, and U.S. Provisional Application No. 62/542,223, filed 7 Aug. 2017, both of which are incorporated by reference herein.

FIELD OF THE INVENTION

The present invention relates to automatic test script generation for a software application executing at a server, and more particularly relates to using artificial intelligence to generate the test script based on a compilation of requests that can be made to the software application.

BACKGROUND

Software testing is an important part of the software development cycle. Whenever software is created and/or modified, the software is typically tested using test cases (also called a "test script") to see whether the software behaves as expected. Many types of tests exist. Regression testing may test whether an updated software satisfies tests that the software passed prior to the update. Performance testing may test whether the software is capable of handling peak load conditions (e.g., with many users submitting requests to the software at a single time). In the past, much of the test scripts have been manually written (i.e., by developers, quality assurance (QA) individuals, etc.) and such creation of test scripts in many cases is a time consuming and costly process. For the sake of speed to market, some enterprises have chosen to release software that is not fully tested, leading to their customers encountering errors (e.g., as the result of insufficient resources to handle peak load, requests for resources that are not available, etc.). Described herein are techniques for generating test scripts with reduced human involvement.

SUMMARY OF THE INVENTION

In accordance with one embodiment of the invention, test scripts are generated from a master key file. The master key file may include one or more scripts of every (or nearly every) possible interaction (e.g., request, presentation, executed action, and so on) a user may have with the software application under test. Often times, the master key file captures each and every request that could be made from a client device to the software application under test executing at a server.

In accordance with one embodiment of the invention, test scripts are generated from a master key file and user logs (i.e., the logs of user activity with a software application under test). The user logs may be recorded in various formats and, in most cases (as may be the case with a user log recorded at/for a server), the user logs may not include complete information regarding how or why the software application under test and/or a server upon which the software application under test is running performed a certain action (e.g., gets, puts, etc.) or series of actions, or complete header information. Test scripts may be constructed based on typical usage patterns recorded in user logs, and information may be extracted from the master key file to populate information that is missing from the user logs, such as a session identifier (ID) or header.

In accordance with one embodiment of the invention, a method for generating one or more HTTP-level test scripts may include using a master key file generator to generate a master key file, in which the master key file comprises each and every request that can be transmitted from a client device to a server on which a software application under test is executing. A user log may then be received, in which the user log is generated by executing a recording software application which monitors server-side communication. A determination may then be made as to whether there is sufficient information in the user log to generate one or more HTTP-level test scripts. If there is insufficient information in the user log, one or more HTTP-level test scripts may be generated based on the user log and information extracted from the master key file.

In accordance with one embodiment of the invention, a method for generating one or more user experience (UX)-level test scripts may include using a master key file generator to generate a master key file, in which the master key file comprises (i) each and every request that can be transmitted from a client device to a server on which a software application under test is executing, and (ii) pairings between a user action and a server request that results from the user action. A user log may then be received, in which the user log is generated by executing a recording software application which monitors server-side communication. One or more HTTP-level server requests may then be generated based on the user log and information extracted from the master key file. Next, one or more HTTP-level server requests may be mapped into user level requests using the user action to server request pairings stored in the master key file. The user level requests may form one or more user experience (UX)-level test scripts.

In accordance with one embodiment of the invention, a method for correcting errors in a server request may include receiving a request that is to be transmitted to a server. A determination may then be made as to whether any errors are present in the request. If errors are present in the request, error information generated by an auto-correlation process may be mapped to an auto-correlated master key file. Errors in the request may then be automatically corrected by parsing, mapping, and replacing dynamic values in the request based on the auto-correlated master key file. The corrected request may then be transmitted to the server.

In accordance with one embodiment of the invention, a method for generating one or more test scripts without the use of user logs may include using a master key file generator to generate a master key file, in which the master key file comprises each and every request that can be transmitted from a client device to a server on which a software application under test is executing. Next, a determination may be made that no user log is available, in which the user log refers to a log that is generated by executing a recording software application which monitors server-side communication. One or more test scripts may then be generated based on the master key file.

These and other embodiments of the invention are more fully described in association with the drawings below.

BRIEF DESCRIPTION OF THE DRAWINGS

The present application is illustrated by way of example, and not limitation, in the figures of the accompanying drawings, in which.

Figure 1A:
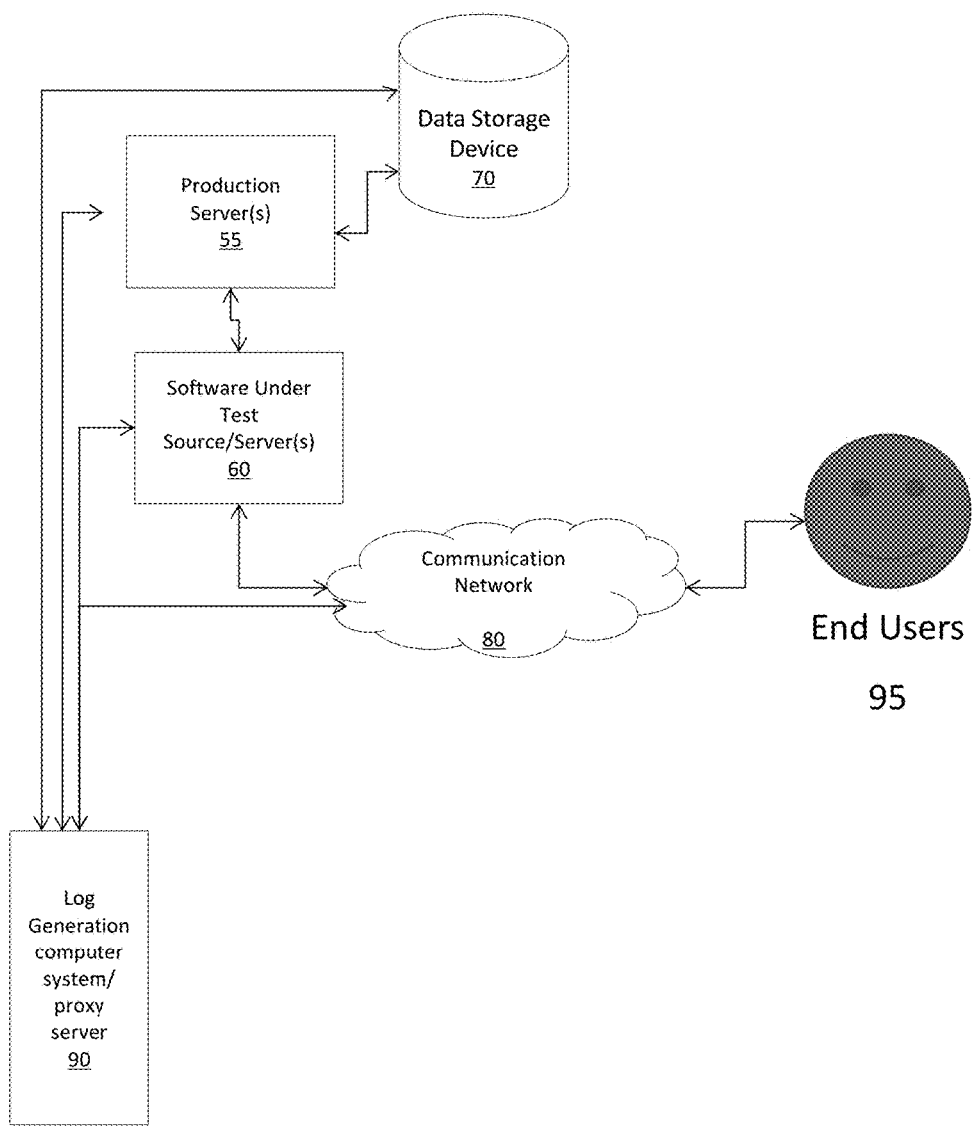
FIG. 1A is a block diagram depicting an example of a system for performing an automated test of a computer software application, in accordance with some embodiments of the present invention.

Throughout the drawings, the same reference numerals and characters, unless otherwise stated, are used to denote like features, elements, components, or portions of the illustrated embodiments. Moreover, while the subject invention will now be described in detail with reference to the drawings, the description is done in connection with the illustrative embodiments. It is intended that changes and modifications can be made to the described embodiments without departing from the true scope and spirit of the subject invention as defined by the appended claims.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps. While the sequence diagrams each present a series of steps in a certain order, the order of some of the steps may be changed.

The present invention is directed to systems, devices, and methods for testing one or more software applications and/or different versions of a particular software application and the development of test scripts and test scenarios (i.e., a group of two or more test scripts) by which to run the tests. In some cases, test scripts and test scenarios may be developed using logs of user activity with a software application as the software application is running on a server, such as a production server. When no user logs exist, test script(s) may be generated via one or more processes as will be explained below.

When user logs do exist, the user logs may be Hypertext Transfer Protocol (HTTP) or server logs. In other instances, the logs may be a recording of user interactions with the software application under test at, for example, the browser or user experience (UX) level. The logs of user activity with a software application under test may be referred to herein as "user logs." The user logs may be recorded in various formats and, in most cases (as may be the case with a user log recorded at/for a server), the user logs may not include complete information regarding how or why the software application under test and/or a server upon which the software application under test is running performed a certain action (e.g., gets, puts, etc.) or series of actions, or complete header information. These little bits of information are referred to as "breadcrumbs", which can be re-assembled to follow a user workflow (e.g., a sequence of user interactions with a software application), but do not save all of the actual HTTP information that transpired during the workflow. The user logs may be processed, analyzed, and/or combined with other information to derive one or more test scripts, which may then be combined into a test scenario and/or executed individually to conduct tests of the software application under test on the same or a different server.

FIG. 1A depicts a block diagram of system 50, which includes elements configured to provide one or more software applications and/or different versions of a particular software application to users. The users may be end users, testers, or any users who may wish to interact with the software application. System 50 may include a log generation computer system/proxy server 90, a software application 60 residing on a production (or other) server 55, a data storage device 70, a communications network 80, and end users 95. In some embodiments, one or more components of system 50 may be distributed across two or more physical locations. In some instances, one or more components of system 50 may be included in another component of system 50. For example, in some embodiments, log generation computer system/proxy server 90 may be resident in production server 55. In some embodiments, some or all components of system 50 may be hosted in the cloud and in other embodiments, may not be accessible from outside of a company or firewall.

Figure 1B:
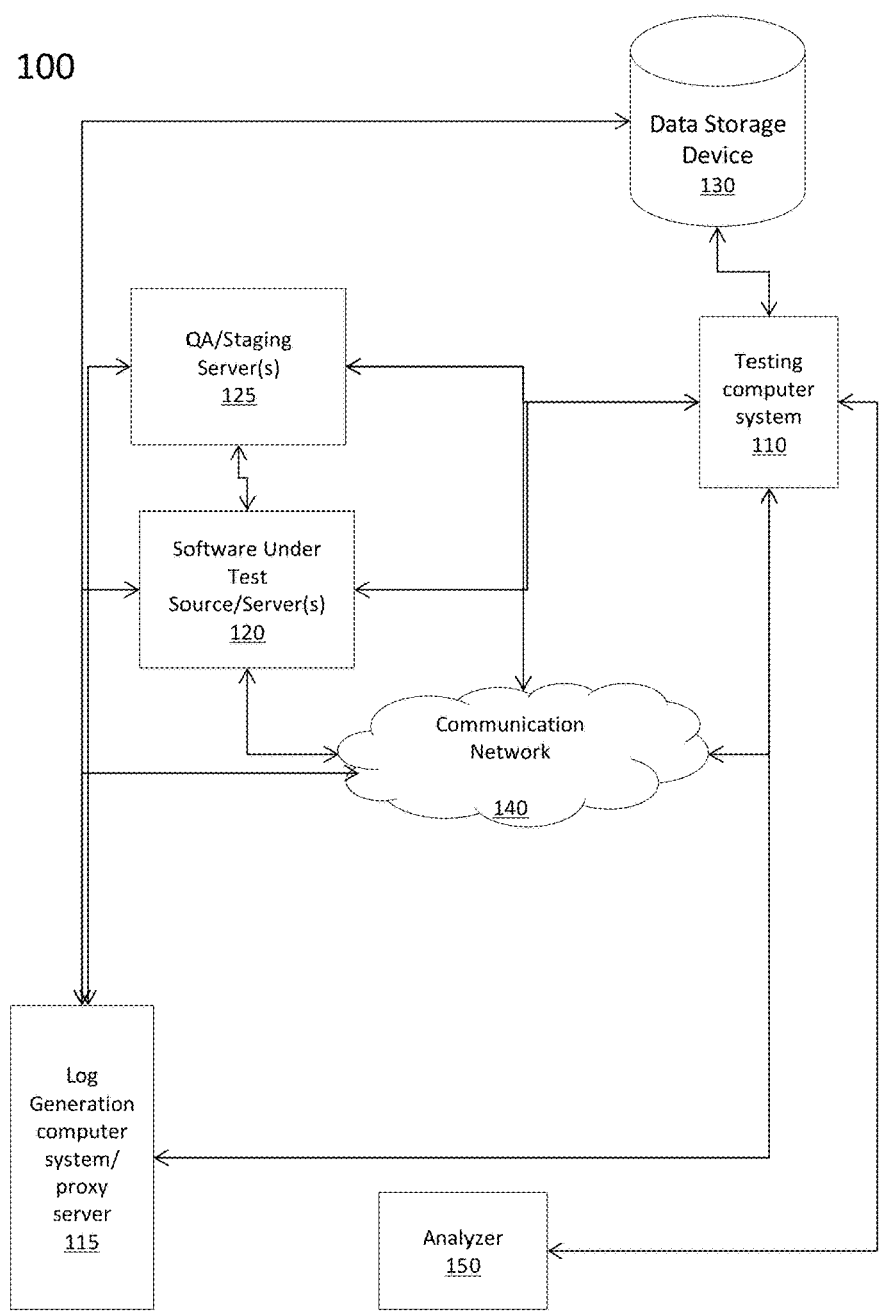
FIG. 1B is a block diagram depicting an example of a system for performing an automated test of a computer software application, in accordance with some embodiments of the present invention.

FIG. 1B depicts a block diagram of a system 100, which includes elements configured to test one or more software applications and/or different versions of a particular software application and develop test scripts and test scenarios as described herein. System 100 may include a testing computer system 110, a log generation computer system/proxy server 115, a software application under test source/server 120, a quality assurance (QA)/staging server 125, a data storage device 130, and a computer network 140. In some embodiments, one or more components of system 100 may be distributed across two or more physical locations. In some instances, one or more components of system 100 may be included in another component of system 100. For example, in some embodiments, log generation computer system/proxy server 115 may be resident in testing computer system 110. In some circumstances, system 100 may not include a software application under test source/server 120 or QA/staging server 125. Additionally, or alternatively, some embodiments of system 100 may include two or more of testing computer system 110, log generation computer system/proxy server 115, software application under test source/server 120, QA/staging server 125, and/or data storage device 130 that may, in some instances, be geographically distributed. Additionally, or alternatively, some embodiments of system 100 may include virtual versions of the following system components: testing computer system 110, log generation computer system/proxy server 115, software application under test source/server 120, QA/staging server 125, and/or data storage device 130 that may, in some instances, be hosted in the cloud.

Figure 2:
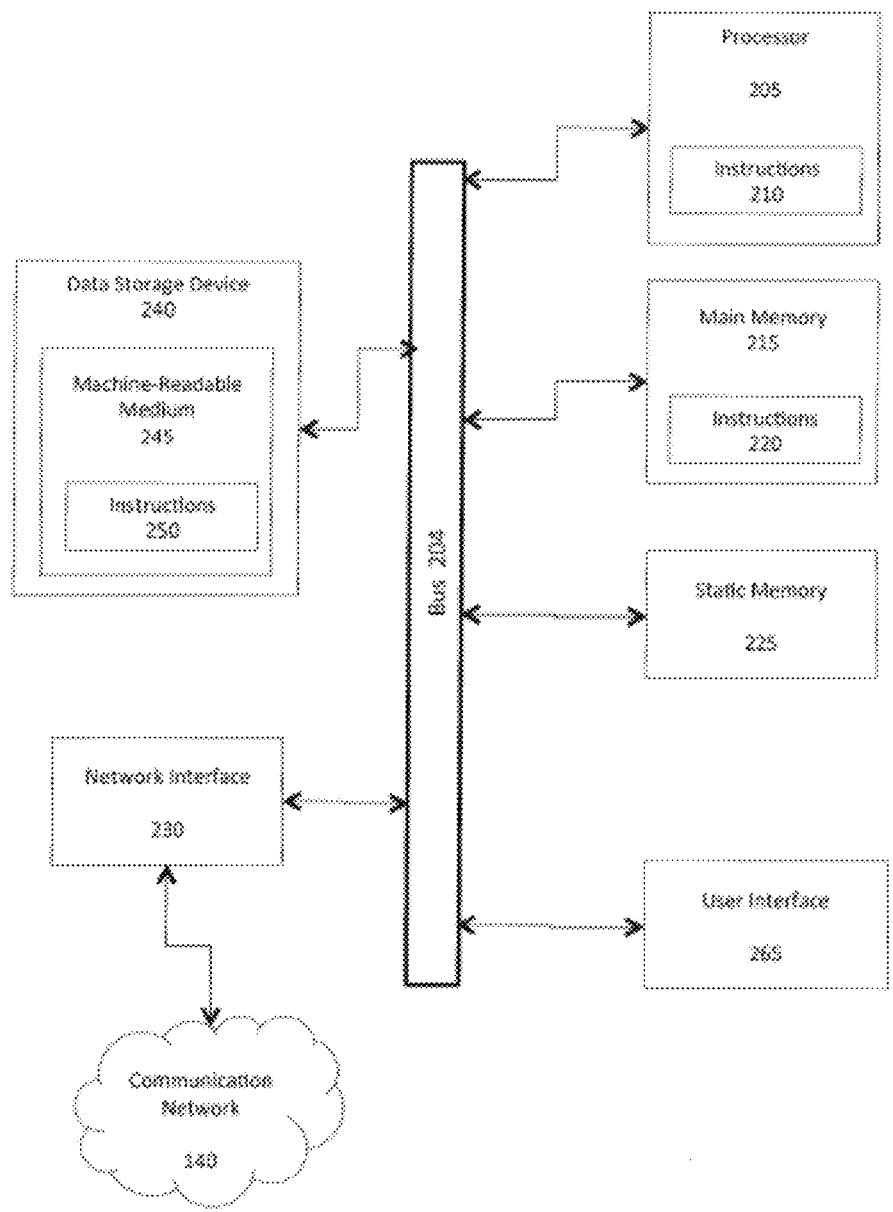
FIG. 2 is a block diagram illustrating exemplary components included within a computer system, in accordance with some embodiments of the present invention.

FIG. 2 is a block diagram illustrating one example of a testing computer system 110 within which a set of instructions 210, 220, and 250 for causing testing computer system 110 to perform any one or more of the methodologies discussed herein may be executed. In this example, components of testing computer system 110 are coupled directly, or indirectly, to a communication bus 204, although in other cases layers of busses or, indeed, different busses or other communication paths may be used to communicatively couple the various components of this device. Therefore, it should be appreciated that the example shown in FIG. 2 is intended only as one possible computer system configuration and is not intended to limit the scope of the present invention in any way.

In alternative embodiments, computer system 110 operates as a standalone device or may be connected (e.g., communication network 140) to other machines. In a network deployment, computer system 110 may operate in the capacity of a client machine in a server-client network environment, or as a peer machine in a peer-to-peer (or distributed) network environment.

Testing computer system 110 includes a network interface device 230 coupled to bus 204. Network interface device 230 provides a two-way data communication path for computer system 110. For example, network interface device 230 may be a wired or wireless local area network (LAN) interface to provide a data communication connection to a compatible LAN (such as a LAN that uses an IEEE 802.11a/b/g/n communication protocol). Computer system 110 can send messages and receive data, sets of instructions, and/or content elements through network interface device 230. A user of computer system 110 may communicate with computer system 110 via user interface 265. Exemplary user interfaces 265 include a keyboard, mouse, and microphone.

Testing computer system 110 also includes a processor 205 (e.g., a central processing unit (CPU), a graphics processing unit (GPU), or both), a main memory 215 (e.g., read-only memory (ROM), flash memory, dynamic random access memory (DRAM) such as synchronous DRAM (SDRAM) or Rambus DRAM (RDRAM), etc.), and a static memory 225 (e.g., flash memory, static random access memory (SRAM), etc.), which communicate with each other via a bus 204 or other communication mechanism for communicating information.

Testing computer system 110 may further include a data storage device 240 and a main memory (e.g., RAM) 215 for storing, for example, a received software application including one or more sets of instructions 220. Data storage device 240 may include a non-transitory machine-readable storage medium 245 on which is stored one or more sets of instructions 250 (e.g., software) embodying any one or more of the methodologies or functions described herein. Set of instructions 250 as well as any received software application may also reside, completely or partially, within main memory 215 and/or within processor 205 during execution of various operations by computer system 110. In some embodiments, static memory 225 and processor 205 may also constitute non-transitory machine-readable storage media (at least in part). In some cases, set of instructions 250 may be transmitted or received over a communication network 140 via network interface device 230 as, for example, a software application or an update to a software application. In alternative embodiments, hard-wired circuitry may be used in place of, or in combination with, set of instructions 250 to implement the invention. Thus, embodiments of the invention are not limited to any specific combination of hardware circuitry and software.

While set of instructions 250 are shown in an exemplary embodiment to be on a single medium 245, the term "non-transitory machine-readable storage medium" should be taken to include a single medium or multiple media (e.g., a centralized or distributed database or data source and/or associated caches and servers) that store the one or more sets of instructions 250. The term "non-transitory machine-readable storage medium" shall also be taken to include any non-transitory medium that is capable of storing, encoding, or carrying a set of instructions for execution by computer system 110 and that cause computer system 110 to perform any one or more of the methodologies of the present invention. The term "non-transitory machine-readable storage medium" shall accordingly be taken to include, but not be limited to, solid-state memories, optical media, and magnetic media.

Figure 3:
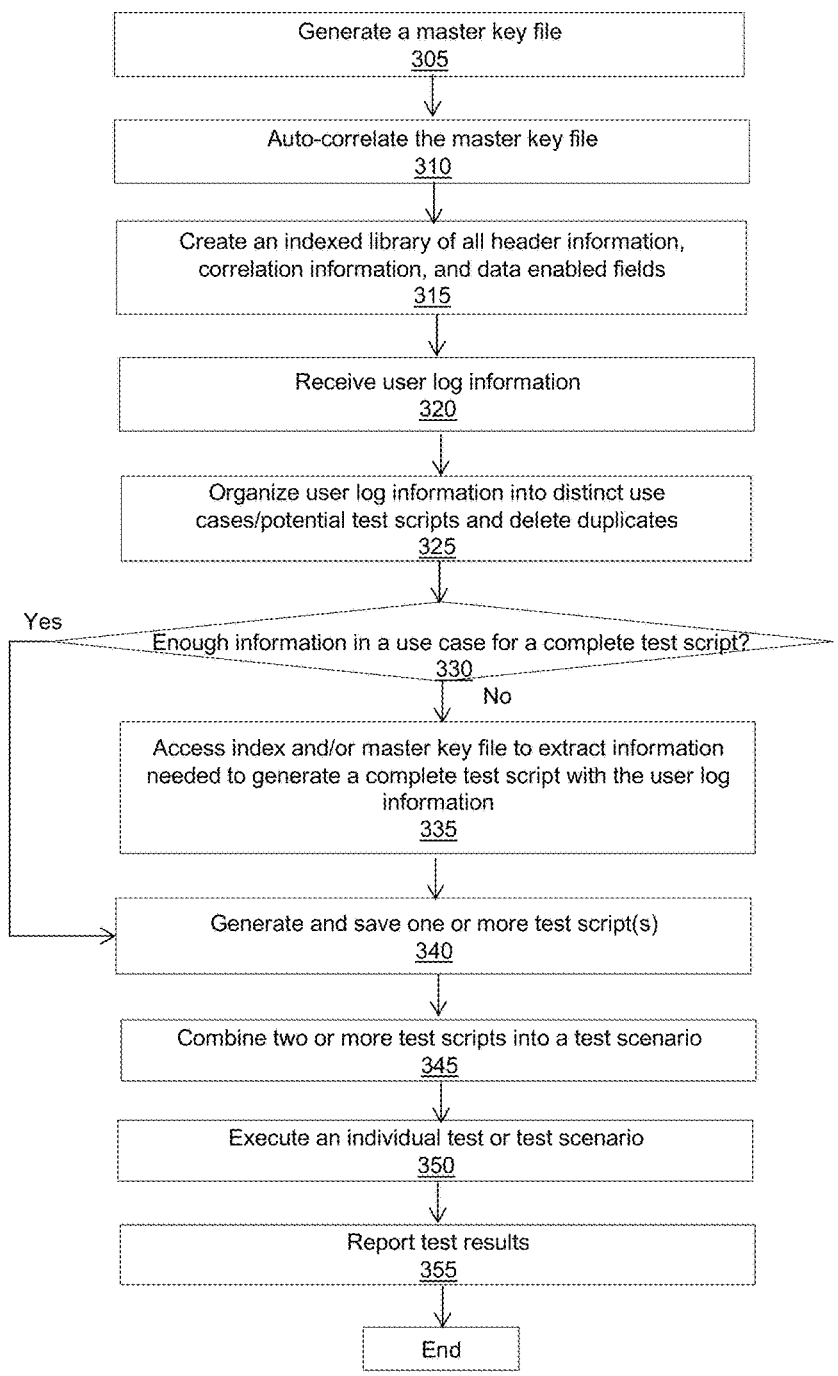
FIG. 3 is a flow chart depicting exemplary processes, in accordance with some embodiments of the present invention.

FIG. 3 provides a flow chart illustrating a process 300 for generating a test script and/or test scenario for testing a computer software application ("also referred to herein as a "software application under test") in accordance with the present invention. Process 300 may be executed by, for example, utilizing system 50 and/or system 100 and/or any component or combination of components thereof.

Initially, in step 305, one or more master key file(s) for the software application under test may be generated. The master key file may include one or more scripts of every (or nearly every) possible interaction (e.g., request, presentation, executed action, and so on) a user may have with the software application under test. Often times, the master key file captures each and every server request that could be made from a client application.

In some cases, the master key file, or a portion thereof, may be generated by a human operator while the human operator interacts with the software application on a production server or with the software application under test. In other instances, the master key file, or a portion thereof, may be automatically generated (i.e., without human involvement) by a software program designed to execute all, or nearly all, possible interactions with the software application under test. In some instances, this software program may automatically generate requests for each page listed on a site index and/or server index associated with the software application under test.

In some embodiments, the master key file may be generated while the software application under test is operating/running on one or more production server(s), such as software application under test source/server(s) 120. Additionally, or alternatively, the master key file may be generated while the software application under test is operating/running on one or more QA and/or staging server, such as QA and/or staging server(s) 125. Additionally, or alternatively, the master key file may be generated by recording user interactions with the software application under test by an HTTP recorder or proxy server running on testing computer system 110 and/or a log generation computer system/proxy server like log generation computer system/proxy server 115. In some instances, the proxy may be placed on any server running the software application under test in order to capture enough users of the respective server to create correctly formed requests/complete use cases for inclusion in the master key file.

The master key file may be in any format/file type including, but not limited to, a HTTP Archive File (HAR) format that records actual user interactions and/or simulated user interactions (as is the case when the master key file, or a portion thereof, is auto-generated) with the software application under test. The master key file may include, for example, headers, server (Internet Protocol) IP addresses, and other data that is normally available/executed at the HTTP level.

In some embodiments, the master key file may be long and may be automated from a user experience driven script that may, for example, go on to create a HAR file using a proxy or other mechanism to capture HTTP level interactions. In many circumstances, the master key file is a repeatable and reusable script. The master key file may provide information that may be missing from the breadcrumbs (such as session information or complete get or put information for a particular request or set of requests) or log/use case information or user logs or similar files for issuing any server request. In some embodiments, the master key file may be used to provide the testing computer system with information about the software application under test, as well as provide examples of properly formed requests and/or headers for the software application under test or a server running the software application under test.

In some embodiments, the master key file is created using, for example, one or more QA servers, like QA server/staging server 125, a testing computer system like testing computer system 110, or servers one will want to test against later, such as software under test source/server 120.

Next, the master key file(s) may be auto-correlated (step 310) by, for example, running, or otherwise executing, the master key file to determine if there are any errors included therein on a subsequent run. An exemplary error would be when the target server is expecting specific information (e.g., a session ID or header) from a particular test script and/or master key file and it is not included in therein. The error information generated by execution of the auto-correlation process may be returned from the servers in parsed responses, which may be mapped to particular test script/ master key file so that it may then be corrected. In some embodiments, this mapping may generate an index, master library, or map that may be used to locate, extract and/or replace dynamic values of incomplete test scripts. In general, this auto-correlation generates a map of responses from the server that will then be used in a subsequent request to the server. This automatic parsing and mapping, and replacement of values in a future request or requests may be required in order to execute HTTP level scripts in subsequent test runs or more than one in parallel. In the example of a session ID, each user may be issued a unique session identifier (ID) from the server in the form of a response. While a browser with its client-side code will know how to include the session ID in requests going forward, a script executed solely at the HTTP level would not include such logic and thus the mapping and parsing of server responses to be used in subsequent requests may be critical in many instances. The knowledge of this mapping, parsing, and replacement of values represents the correlation information.

Then, an indexed library of all header information, correlation information, and data enabled fields for the master key file may be created (step 315). In some instances, the index may represent a dictionary of how a correct request could be made and/or one or more complete test scripts may be properly executed. A correct request/test script may include all information expected/required by the server to accept and/or execute the request in a proper format. Improperly or malformed requests and/or test scripts will generally be rejected from inclusion in the index and/or master key file as they would be rejected by the server or result in an error.

Next, in step 320, user log information may be received from, for example, log generation computer system/proxy sever 115, a log kept at a server such as QA/staging server(s) 125, software application under test source/server(s) 120, and/or testing computer system 110. Information included in the user logs may track some, or all, server activity of users when they use the software application under test, or a version of the software application under test that one may later wish to place under test. The user log information may include a log of user interactions (e.g., gets, puts, posts, and responses) with a software application under test that are captured and stored/recorded. However, in many cases, the user logs are limited in what is stored to keep system overhead to a minimum, especially on production servers. Often times, the logs are stored with a time stamp, but do not have session information or complete get or put information for a particular request or set of requests. Other times, the user log information for a request or script may have session information and time stamps along with target Uniform Resource Locators (URLs). In general, the information included in these logs may not include enough information (e.g., headers, etc.) to properly form requests and/or test scripts directly from them. Incomplete recordings of user interactions with the software application under test may be referred to herein as "breadcrumbs."

The quantity of user log information received in step 320 may range from, for example, hundreds or thousands or even millions of recordings of user interactions with the software application under test at a time. In some embodiments, step 320 may be executed by a recording software application, such as SPLUNK® or SUMO LOGIC®, at the server-side. In some cases, the user log information may be in a National Center for Supercomputing Applications (NCSA) common log format using, for example, the W3C standard, and could be supplied natively within the server itself (such as in Internet Information Services (IIS) servers).

In step 325, the user log information may be organized, or sorted, into distinct use cases and/or potential test scripts and reformatted (if necessary) into a preferred format such as a comma separated value (CSV) format or text format. In some instances, execution of step 325 may include deletion of duplicate distinct use cases and/or potential test scripts.

In step 330, it may be determined whether there is enough information included in one or more of the distinct use case(s) and/or potential test script(s) to generate a complete test script therefrom. If not, then the index of step 315, auto-correlated master key file of step 310 and/or master key file of step 305 may be accessed to extract information needed to complete, or otherwise fill in missing information for, the distinct use case(s) and/or potential test script(s) (step 335). When there is enough information to generate distinct use case(s) and/or potential test script(s) and/or following step 335, one or more test scripts may be generated and saved (step 340). In most cases, each test script will include enough information to complete a request, or a series of requests, of the server. Step 340 may be executed many times (e.g., hundreds, thousands, or millions) to generate a series of test scripts for different aspects of the software application under test.

Next, a scenario file, which references one or more (and potentially hundreds or thousands) of the test scripts generated in step 330, may be generated using, for example, a large scenario creator software application running on the testing computer system 110 (step 345). In some embodiments, the test scenario may include the master key file, which may be correlated, or include correlation mapping; one or more recorded or written use cases (in a preferred format such as CSV); and a data set for data driving the test scripts. The data set may include data (e.g., passwords, usernames, names, addresses, form data, drop down choices, etc.) useful for entering into forms or other portions of the software application under test. In some embodiments, a maximum number of test scripts to be performed in parallel may also be specified in the test scenario so as to, for example, not overload the software application under test source/server. The large scenario creator is a software application that creates functional or other test scenario files rapidly from hundreds to thousands or millions of user logs, and may also utilize other inputs such as the master key file, correlation information and a data set.

Then, the one or more tests of the software application under test may be executed using the generated test script and/or test scenario (step 350) and the results of the tests may be reported to the user (step 355). In many instances, execution of the test(s) may include running one or more test scripts, which are complete. In some cases, multiple tests scripts may be run in parallel.

In some cases, executing step 350 may include coordination of an incomplete test script (e.g., a use case from the log) with the indexed library and/or master key file from which, for example, a header and other information that may be missing from an incomplete test script may be added to the incomplete test script to make it complete. The test results provided in step 355 may be provided in a pass/fail format and, in some instances, may include step timing or their information.

Additionally, or alternatively, step 355 may include analyzing the test results with, for example, analyzer 150.

In some embodiments, the system and methods disclosed herein may implement automatic test script changes when a software application under test changes (e.g., is updated or undergoes a version change). At times, process 300 may have to be partially, or completely, re-run to accommodate changes to, for example, the UX or application programming interface (API) of the software application under test level so that new user log data is captured and new master key files and/or test scripts may be generated to accommodate changes to the software application under test. Alternatively, changes to the software application under test that may require changes in the master key file and/or test scripts may be flagged or otherwise noted. For example, "new requests," "replaced requests," and/or "removed requests" may be flagged so that the systems/processes described herein may take this information into account by, for example, reforming, editing, or otherwise modifying, the test scripts associated with the flagged requests so that they are valid again with the new/different version of the original software application under test. In some instances, changes to the original software application under test may render some test scripts completely invalid or unnecessary (as may be the case when a particular request is removed from the software application under test) and these invalid or unnecessary test scripts may be discarded or deleted from the test scenario. Changes to an application may also be noted by the test user in a simple description language, which would be used to automatically modify the test scripts generated by the user logs in conjunction with the master key file and other data.

In another embodiment, user-experience (e.g., at the UX level) driven test scripts may be derived from, for example, user logs captured at the server sometimes in conjunction with the master key file information. In many instances, user logs only include information regarding actions performed in the HTTP stream, and often the recorded information is incomplete. Thus, user actions at the UX level, executed via, for example, an Internet browser or mobile device, that cause a request to the server to occur are typically unrecorded and, consequently, may be unknown. However, UX interactions that tie to/cause certain server requests may be incorporated into (e.g., by recording or other processes) the master key file. At times, the UX interactions are recorded when information used to generate the master key file is recorded and the pairing (e.g., cause and effect) may occur during the recording process. Additionally, or alternatively, UX actions can be executed (automatically or manually) by system 100 and/or the testing computer system 110 to determine what server request results from/is correlated to the UX action and these UX actions and one or more correlated server request(s) may be indexed and/or mapped to one another in, for example, the master key file. In some embodiments, the mapping may be done by automatic pairing, backwards in time, of the UX action and server request to then create a UX driven test script for each user flow/UX interaction. For example, when a user (or software replicating a user action) performs a UX action (e.g., clicking on a graphically displayed button, filling out a form on a webpage, etc.) that results in a server request, the user action and the server request may be paired and recorded in the master key file or other file format. This pair of the user action and the server request may be used to recreate the UX flow (series of events/user actions) that resulted in issuance of the server request. This process may be repeated for some, or all, actions possible within the UX of the software application under test.

During the running of any tests created in methods herein, the server responses may be compared by the test computer to the responses obtained from the user logs.

In another embodiment, user logs may not be necessary and/or used when, for example, all information about paths in the application and/or decisions that may be made, and/or actions that may be requested may have been mapped by a master key file generator (or by human interaction) and test scripts may be generated directly from this data (without the use of user logs). While these test scripts may not necessarily reflect actual user flows (i.e., a series of actions to taken by a user), the volume of test scripts that may be generated and executed in this manner may enable adequate testing of the software application under test by executing instructions that involve most, if not all, code associated with the software application under test during testing.

In another embodiment, user logs may be leveraged/utilized to reduce the number of test scripts to be executed when testing the software application under test. For example, there may be millions of user logs, but by comparing use cases/user flows in such logs, duplicates may be eliminated and, in some cases, use cases and/or user flows may be combined, and/or infrequently executed use cases/user flows may be deleted so that fewer test scripts are generated and the test scripts that are generated are targeted to user flows/use cases that are most likely to be needed by actual users using the software application under test following the testing phase (i.e., when the software application under test is in actual use). For example, 1 million user logs of user flows/test cases may be reduced to, for example, 100,000, 10,000, 1,000, or 100 test scripts. This reduction in the number of test scripts increases the overall efficiency of the testing scenario and leads to faster testing times.

In another embodiment, when there are changes in the software application under test, those changes may be automatically recognized by the testing software by comparing, for example, the master key file for a previous version of an application with the master key file for a current version of the application. For example, if a link was changed from "shoes" to "footwear", this change can be automatically sensed and then applied in the test script creation phase to ensure that the test scripts will run against the new/updated version of the software application under test. This can be done automatically without any user description of such changes.

Hence, methods, systems, and non-transitory machine-readable medium for AI-driven automatic test script generation for testing of a computer software application have been herein described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A method, comprising:
   generating, by a master key file generator, a master key file, wherein the master key file comprises each and every request that can be transmitted from a client device to a server on which a software application under test is executing;
   receiving a user log, wherein the user log is generated by executing a recording software application which monitors server-side communication;
   determining whether there is sufficient information in the user log to generate one or more Hypertext Transfer Protocol (HTTP)-level test scripts; and
   if there is insufficient information in the user log, generating the one or more HTTP-level test scripts based on the user log and information extracted from the master key file.

2. The method of claim 1, wherein the master key file is generated by recording user interactions with the software application under test by an HTTP recorder or proxy server.

3. The method of claim 1, wherein the information extracted from the master key file includes one or more of a session identifier (ID) or a header.

4. The method of claim 1, further comprising:
   executing the one or more HTTP-level test scripts so as to test the software application under test.

5. The method of claim 1, further comprising:
   aggregating the one or more HTTP-level test scripts into a test scenario, wherein the test scenario further includes a data set for data driving the test scripts, and wherein the data set includes one or more of passwords, usernames, names, addresses and form data for entering into forms or other portions of the software application under test.

6. The method of claim 1, further comprising:
   auto-correlating the master key file, wherein auto-correlating the master key file comprises executing the master key file to determine whether one or more errors are included in the master key file.

7. The method of claim 5, wherein the one or more errors includes the master key file lacking a session identifier (ID) or header that is expected by the server.

8. A method, comprising:
   generating, by a master key file generator, a master key file, wherein the master key file comprises each and every request that can be transmitted from a client device to a server on which a software application under test is executing, and pairings between a user action and a server request that results from the user action;
   receiving a user log, wherein the user log is generated by executing a recording software application which monitors server-side communication;
   generating one or more Hypertext Transfer Protocol (HTTP)-level server requests based on the user log and information extracted from the master key file; and
   mapping the one or more HTTP-level server requests into user level requests using the user action to server request pairings stored in the master key file, wherein the user level requests form one or more user experience (UX)-level test scripts.

9. The method of claim 8, further comprising:
   executing the one or more UX-level test scripts by an Internet browser or mobile device so as to test the software application under test.

10. The method of claim 8, further comprising:
    aggregating the one or more UX-level test scripts into a test scenario, wherein the test scenario further includes a data set for data driving the test scripts, and wherein the data set includes passwords, usernames, names, addresses, form data and drop down choices for entering into forms or other portions of the software application under test.

11. A method, comprising:
    receiving a request that is to be transmitted to a server;
    determining whether any errors are present in the request;
    if errors are present in the request, mapping error information generated by an auto-correlation process to an auto-correlated master key file;
    automatically correcting the errors in the request by parsing, mapping, and replacing dynamic values in the request based on the auto-correlated master key file; and
    transmitting the corrected request to the server.

12. The method of claim 11, wherein the error information comprises a missing session identifier that is expected by the server.

13. The method of claim 11, wherein the error information comprises a missing header that is expected by the server.

14. The method of claim 11, wherein the auto-correlated master key file comprises a map of responses from the server.

15. The method of claim 14, wherein map of responses from the server comprises one or more of an indexed library of all header information, correlation information, or data enabled fields.

16. The method of claim 15, wherein the indexed library represents a dictionary of how a correct request is made.

17. The method of claim 11, wherein the request is part of a Hypertext Transfer Protocol (HTTP)-level test script.

18. A method, comprising:
    generating, by a master key file generator, a master key file, wherein the master key file comprises each and every request that can be transmitted from a client device to a server on which a software application under test is executing;
    determining that no user log is available, wherein the user log refers to a log that is generated by executing a recording software application which monitors server-side communication; and
    generating one or more test scripts based on the master key file.

19. The method of claim 18, wherein at least some of the test scripts do not reflect actual user flows.

20. The method of claim 18, wherein at least some of the test scripts do reflect actual user flows.

* * * * *